(12) United States Patent
Kent, Jr. et al.

(10) Patent No.: US 10,577,730 B1
(45) Date of Patent: Mar. 3, 2020

(54) CABLE ASSEMBLY DEVICES, SYSTEMS, AND METHODS

(71) Applicant: Southwire Company, LLC, Carrollton, GA (US)

(72) Inventors: Harry William Kent, Jr., Carrollton, GA (US); Myron Deese, Carrollton, GA (US); Chris Marlow, Carrollton, GA (US); Franklin Clarence Calhoun, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 355 days.

(21) Appl. No.: 15/386,238

(22) Filed: Dec. 21, 2016

Related U.S. Application Data (60) Provisional application No. 62/270,396, filed on Dec. 21, 2015.

(51) Int. Cl.
*D03D 41/00* (2006.01)

(52) U.S. Cl.
CPC ....... *D03D 41/00* (2013.01); *D03D 2700/821* (2013.01)

(58) Field of Classification Search
CPC .......... H02G 1/00; H02G 1/005; H02G 1/081
See application file for complete search history.

(56) References Cited

U.S. PATENT DOCUMENTS

| | | | |
|---|---|---|---|
| 3,922,934 A * | 12/1975 | Hiatt | H02G 1/1295 81/9.51 |
| 4,046,045 A * | 9/1977 | Stevens | H02G 1/005 81/9.51 |
| 4,446,617 A * | 5/1984 | Lydell | H01R 43/01 29/749 |
| 4,981,637 A * | 1/1991 | Hyer | B29C 35/06 264/146 |
| 5,884,901 A | 3/1999 | Schilling | |
| 6,705,002 B1 | 3/2004 | Dukes et al. | |
| 6,749,179 B2 | 6/2004 | Supkis et al. | |
| 7,131,637 B2 | 11/2006 | Versteegh | |

* cited by examiner

*Primary Examiner* — Lee D Wilson
(74) *Attorney, Agent, or Firm* — Hartman & Citrin LLC (57) ABSTRACT

Methods, devices, and systems for wire loom assembly are disclosed. A cable assembly device includes an inner core and an outer housing. The inner core includes a receiving member comprising a first end and a second end. The inner core further includes a splitter member attached to the first end of the receiving member. The outer housing encloses at least a portion of the inner core.

14 Claims, 5 Drawing Sheets

CABLE ASSEMBLY DEVICES, SYSTEMS, AND METHODS

CROSS-REFERENCE TO RELATED APPLICATIONS

This application claims priority to U.S. Provisional Application No. 62/270,396, filed Dec. 21, 2015, now expired, which is herein incorporated by reference in its entirety.

BACKGROUND

This description relates generally to the assembly of a wire loom. In particular, this description relates to a cable assembly device and method for insertion of one or more elongated elements, such as wires, cables, and conductors, into the wire loom using the cable assembly device.

In today's technological world, more equipment requires a plurality of wires, cables, and/or conductors to transmit power and communications to and from installed equipment. Management of these elongated elements becomes important. Unbound wires, cables, and conductors can make installation of the same burdensome and can also expose the wires, cables, and conductors to damage during and after installation.

One device for binding a plurality of wires, cables, and/or conductors is loom tubing, such as a wire loom. A wire loom is a flexible tube into which linear elements, such as wires, cables, and conductors, may be run. A wire loom may include a pre-cut split running along a length of the wire loom that allows the wire loom to be spread open, via the split, to receive one or more wires, cables, and/or conductors therein. Alternatively, a wire loom may not be manufactured with a pre-cut split and instead may be cut to include a split after purchasing. Typically, a wire loom is made of flexible corrugated plastic or a cylindrical plastic mesh. Separating the split of a wire loom in order to feed one or more wires, cables, and/or conductors into the wire loom can be a time consuming and tedious process.

SUMMARY

The present disclosure is directed to a cable assembly device. According to various embodiments of the concepts and technologies described herein, the cable assembly device can include an inner core and an outer housing enclosing at least a portion of the inner core. The inner core can include a receiving member having a first end and a second end. The inner core can also include a splitter member attached to the first end of the receiving member. The cable assembly device can be attached to a supporting member.

The present disclosure is further directed to a method for insertion of one or more elongated elements, such as a conductor, into a wire loom. According to various embodiments, a segment of the wire loom can be assembled over at least a portion of an inner core of a cable assembly device. At least a portion of the segment of the wire loom can be enclosed between the inner core of the cable assembly device and an outer housing of the cable assembly device. A conductor is fed into an inner cavity defined by the wire loom as the segment of the wire loom is moved, between the inner core and the outer housing of the cable assembly device, along a length of the cable assembly device.

This Summary is provided to introduce a selection of concepts in a simplified form that are further described below in the Detailed Description. This Summary is not intended to be used to limit the scope of the claimed subject matter. Furthermore, the claimed subject matter is not limited to implementations that solve any or all disadvantages noted in any part of this disclosure.

DETAILED DESCRIPTION

The detailed description provided below in connection with the appended drawings is intended as a description of examples and is not intended to represent the only forms in which the examples may be constructed or utilized. The description sets forth the functions of the examples and the sequence of steps for operating with the examples. However, the same or equivalent functions and sequences may be accomplished by equivalent alternative examples.

The following examples describe methods, devices, and systems to efficiently insert one or more wires, cables, and/or conductors into a wire loom. The term "wire," "cable," or "conductor" as used herein refers to an elongated element that may or may not be electrically conductive and may be comprised of a variety of materials such as for example, metal, polymer, glass fiber, optical fiber, or other elongated, flexible material that may be advantageously inserted into a wire loom.

The terms "loom," "wire loom," "cable loom," "wire or cable loom," or similar terms as used herein refer to a flexible encasement tubing commonly used to bind, enclose, or protect one or more cables. A wire loom is typically constructed of corrugated plastic material in a tubular shape. The wire loom may include a pre-cut split running along a length of the wire loom that allows the wire loom to be spread open, via the split, to receive one or more wires, cables, and/or conductors within an inner cavity defined by the wire loom. Alternatively, a wire loom may not be manufactured with a pre-cut split and instead may be cut to include a split after purchasing. However, wire looms comprised of different materials are contemplated by the embodiments disclosed herein.

The term "cylinder" as used herein generally refers to the classic definition of a right circular cylinder (or segment thereof), which is the surface that is formed by all of the points in space located at a fixed distance from a given straight line that is the axis of the cylinder. However, the disclosure herein is not intended to be so limiting. The term "cylinder" also includes an elliptic cylinder, a parabolic cylinder, or a hyperbolic cylinder, the use of which may be found to be convenient for an application or embodiment without diverging from the inventive concepts described herein.

The term "cone" as used herein generally refers to the classic definition of a "right circular cone" being a solid figure bounded by a circular base in a plane and by a lateral surface formed by the locus of all straight line segments joining the apex to the perimeter of the base, where the axis of the cone is perpendicular to the plane of the base at the base's center and passes through the apex. However, the disclosure herein is not intended to be so limiting. The term "cone" may also include oblique cones in which the axis does not pass perpendicularly through the center of the base. The base of the cone may be any shape and the apex may lie anywhere. However, the base has a finite area and the apex lies outside the plane of the base. The term "cone" may refer either to a hollow lateral surface or to an entire solid.

The following detailed description is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are provided to enable persons skilled in the art to make or use the invention and not to limit the scope of the invention which is defined by the claims. Furthermore, there is no intention to be bound by any expressed or implied theory presented in the preceding background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc., simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the disclosure as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically through one or more additional elements.

While at least one exemplary embodiment will be presented in the following detailed description, it should be appreciated that a vast number of variations exist. It should also be appreciated that the exemplary embodiment or exemplary embodiments are only examples, and are not intended to limit the scope, applicability, or configuration of the invention in any way. Rather, the following detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

In the following description, references are made to the accompanying drawings that form a part hereof, and which are shown by way of illustration, specific embodiments, or examples. Referring now to the drawings, in which like numerals represent like elements through the several figures, aspects of a cable assembly system and cable assembly device along with a method of insertion of one or more elongated elements into a wire loom using the cable assembly device will be described.

Figure 1:
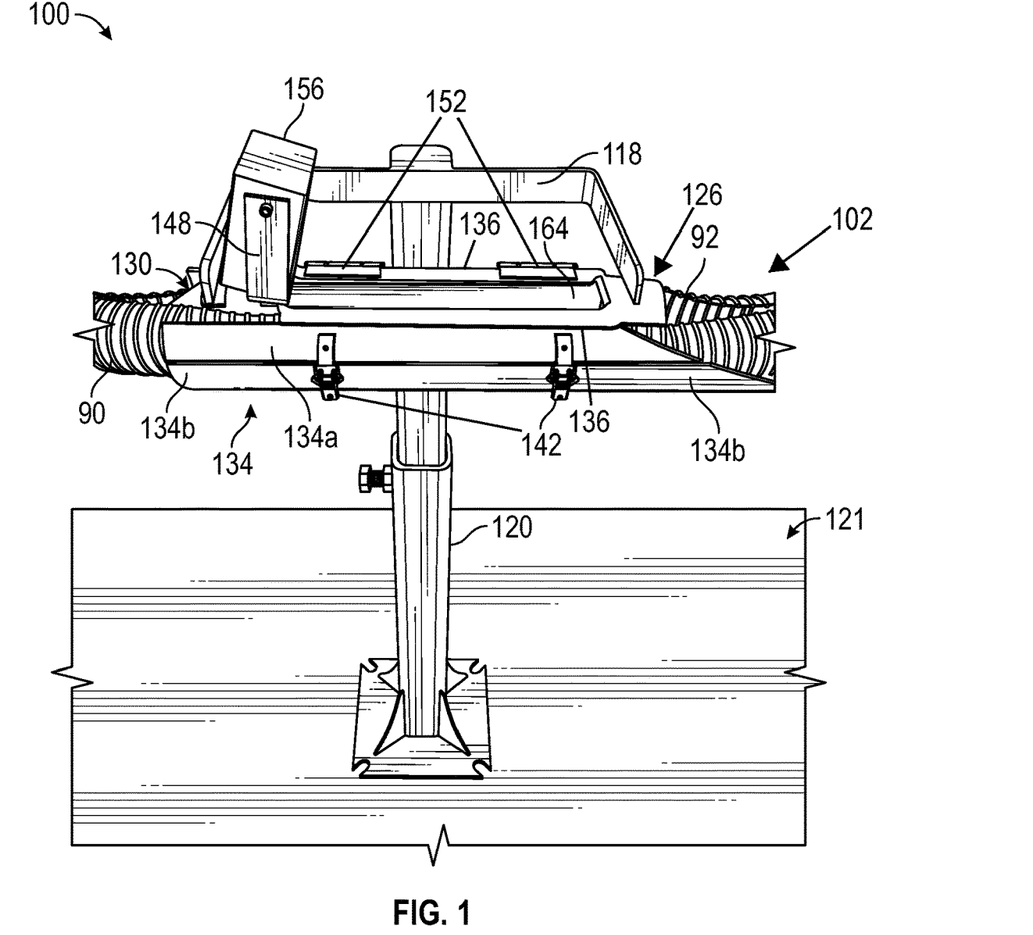
FIG. 1 is a side view of a cable assembly system including a cable assembly device, according to an illustrative embodiment.
Figure 2:
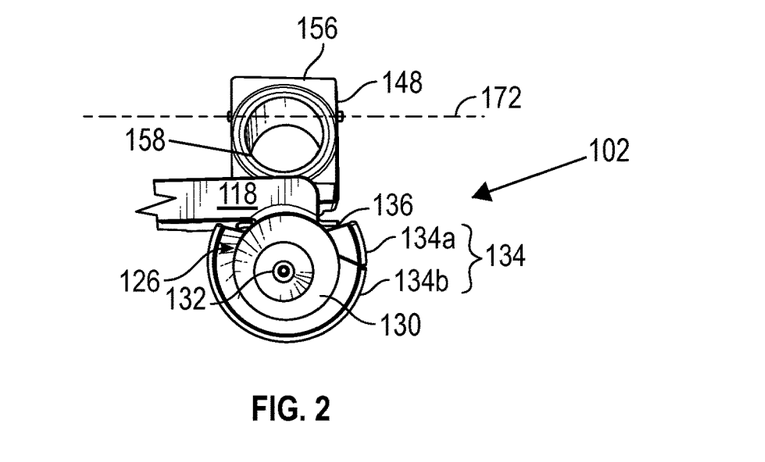
FIG. 2 is a partial front view of the cable assembly system, according to an illustrative embodiment.
Figure 4:
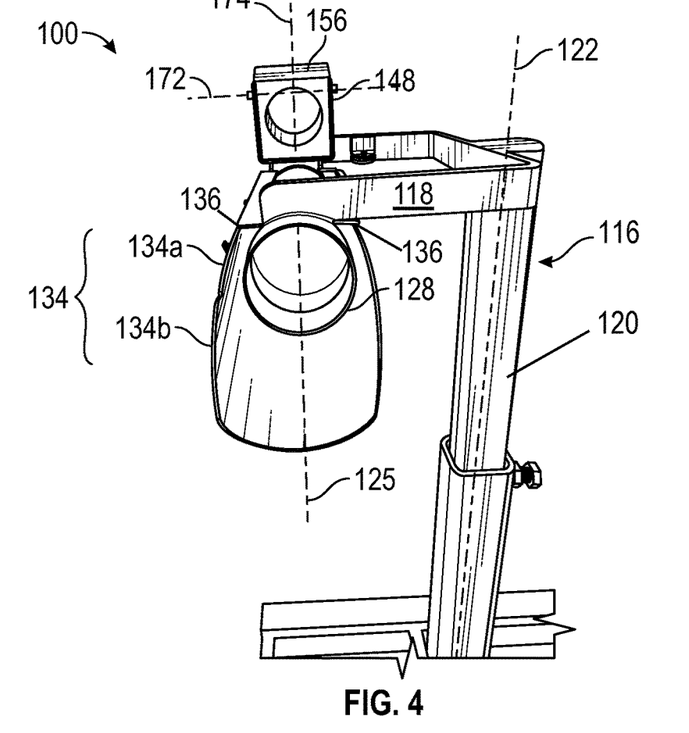
FIG. 4 is a rear perspective view of the cable assembly system, according to an illustrative embodiment.

FIG. 1 provides a side view of a cable assembly system 100 including a cable assembly device 102, according to embodiments described herein. According to embodiments, the cable assembly device 102 includes an outer housing 134 in the form of a first hollow cylinder, or a portion thereof, that surrounds at least a portion of an inner core 126, as illustrated in FIG. 2. The inner core 126 includes a receiving member 128, which may be in the form of a second hollow cylinder, or a portion thereof, and a splitter member 130, each sized such that at least a portion of the inner core 126 fits within at least a portion of the outer housing 134, as illustrated in FIGS. 2 and 4. The outer housing 134 and the inner core 126 may be arranged coaxially, although other near parallel arrangements may be determined to be more advantageous for a particular task.

The outer housing 134 and the inner core 126 may be connected together at one or more attachment points 136. The one or more attachment points 136 may be a single point weld, a portion of flange, support, frame, housing, rib, shell, strut, one or more hinges, such as hinges 152, or other connecting member, or a combination thereof to which both of the outer housing 134 and inner core 126 are affixed.

Figure 3:
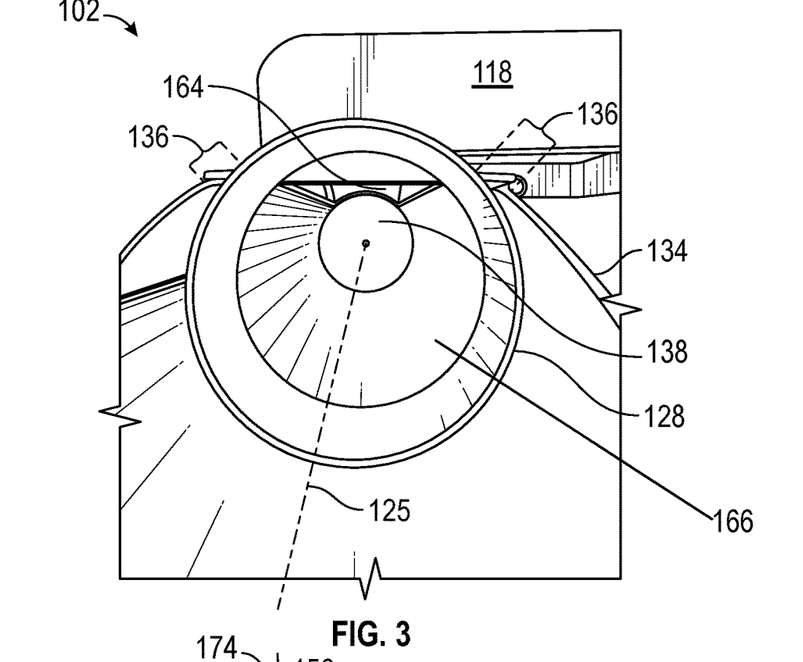
FIG. 3 is a partial rear view of the cable assembly system, according to an illustrative embodiment.
Figure 6A:
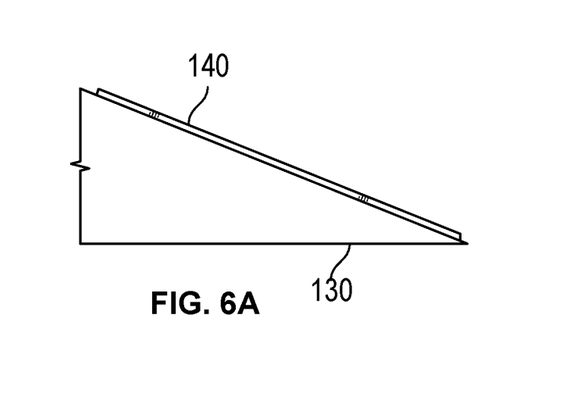
FIGS. 6A-6B illustrate an alternative embodiment of a splitter member of the cable assembly device, according to an illustrative embodiment.
Figure 6B:
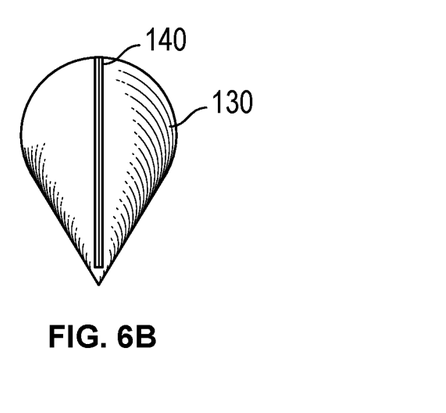
Figure 7:
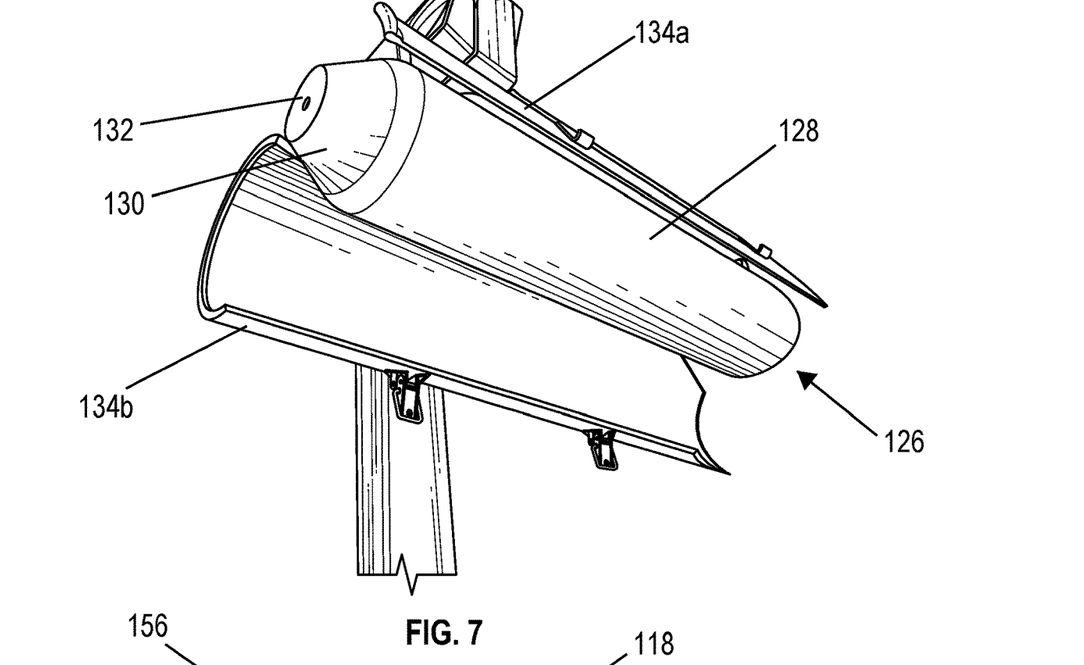
FIG. 7 is a partial bottom view of the cable assembly system including the cable assembly device in an opened position, according to an illustrative embodiment.
Figure 8:
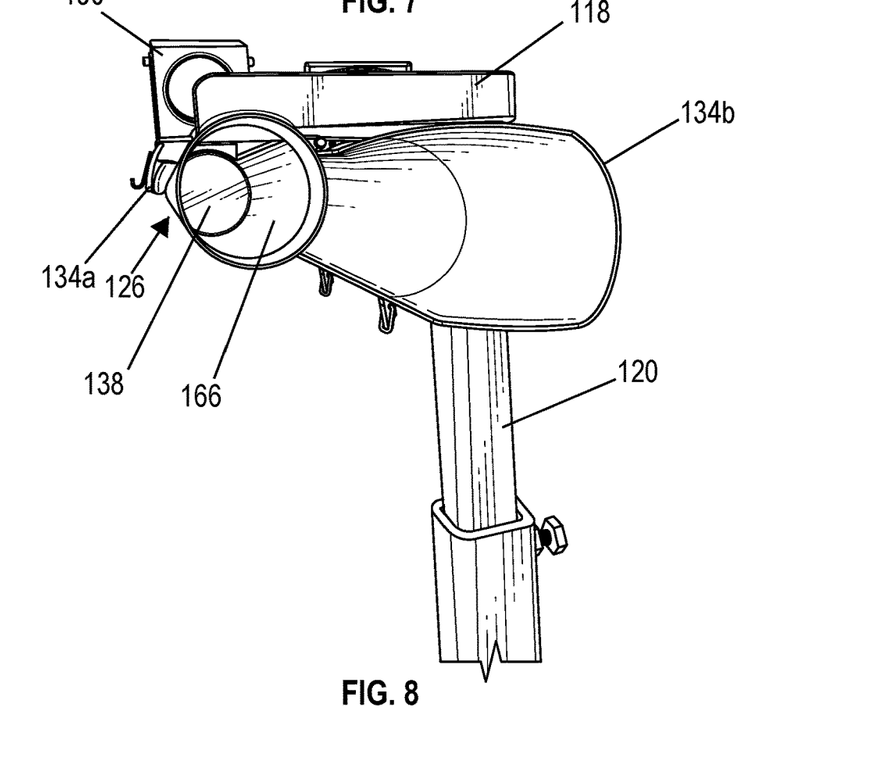
FIG. 8 is a partial perspective view of the cable assembly system including the cable assembly device in the opened position, according to an illustrative embodiment.

According to embodiments, the splitter member 130, as best illustrated in FIG. 7, is mounted on an end of the receiving member 128 of the inner core 126. The splitter member 130 may be a hollow shape, or may be a similar solid shape, that is made of metal, plastic or other durable material suitable for engaging, splitting, and/or spreading a wire loom 90 as the wire loom 90 is forced axially, by a pushing or pulling action, onto a front end 132, illustrated in FIGS. 2, 5, and 7, of the splitter member 130. Exemplary, non-limiting shapes of the splitter member 130 may include a cone, a truncated cone, a bullet, a pyramid or other shape having a first end, such as the front end 132, with a diameter that is smaller than that of a second end, such a base end 138, as illustrated in FIGS. 3 and 8. According to embodiments, the splitter member 130 is sized to fit within the outer housing 134 and is further sized to engage and spread open the wire loom 90 along a longitudinal split 92 of the wire loom 90. Similarly, the receiving member 128 is sized to spread open the wire loom 90 along the longitudinal split 92 of the wire loom 90. When the wire loom 90 is assembled on the inner core 126, the wire loom 90 envelopes at least a portion of the receiving member 128 and the splitter member 130 of the inner core 126 and slides along the inner core 126 between the inner core 126 and the outer housing 134. The splitter member 130 may be symmetrical or may be eccentric, as depicted in the example of FIGS. 6A-6B.

The splitter member 130 may also include a cutting device 140, as illustrated in FIGS. 6A-6B, extending longitudinally along at least a portion of a lateral surface of the splitter member 130. The cutting device 140 may be permanently or removably affixed to the splitter member 130. According to embodiments, the purpose of the cutting device 140 is to cut a single slit, such as the longitudinal split 92, longitudinally along the wire loom 90 as the wire loom 90 is forced onto the splitter member 130 by a pushing or pulling action, if the wire loom 90 was not manufactured or otherwise pre-cut to include a split. Non-limiting examples of the cutting device 140 include a blade, as illustrated in FIGS. 6A-6B, a rotary tool, a hot wire cutter, or any other tool capable of splitting the wire loom 90 longitudinally along a length of the wire loom 90.

The cable assembly device 102 may also include a wire guide 156 mounted within a bracket 148 that is attached to the inner core 126 of the cable assembly device 102, as illustrated in FIG. 1. According to embodiments, the bracket 148 is attached to the end of the receiving member 128 proximate the splitter member 130, instead of at another location along the length of the receiving member 128, to afford one or more conductors the length of the receiving member 128 to be guided by the wire guide 156 into an inner cavity 166 defined by the receiving member 128 and ultimately an inner cavity 94 defined by the wire loom 90 before the wire loom 90 moves beyond the inner core 126, causing the longitudinal split 92 of the wire loom 90 to close because the wire loom 90 is no longer spread apart, at the longitudinal split 92, by the inner core 126 of the cable assembly device 102, as discussed further below. The wire guide 156 may be mounted within the bracket 148 in such a way to allow the wire guide 156 to pivot about a horizontal axis 172 and a vertical axis 174. Additionally, or alternatively, the bracket 148 may be attached to the inner core 126 to allow the bracket 148 to pivot about one or both of the horizontal axis 172 and the vertical axis 174. Exemplary, non-limiting examples of the wire guide 156 may include a block of durable material with an annular opening 158 there through, as illustrated in FIG. 2, that is sized to freely receive one or more conductors and allow the passage of the one or more conductors. The wire guide 156 may also incorporate one or more rollers (not shown) to help with the passage of the one or more conductors through the annular opening 158. Although FIG. 1 illustrates the bracket 148 including the wire guide 156 attached to the inner core 126 of the cable assembly device 102, the bracket 148 and wire guide 156 may be attached to another location of the cable assembly device 102 as long as the location allows the wire guide 156 to direct one or more conductors into the inner cavity 166 of the inner core 126, as discussed further below.

Figure 5:
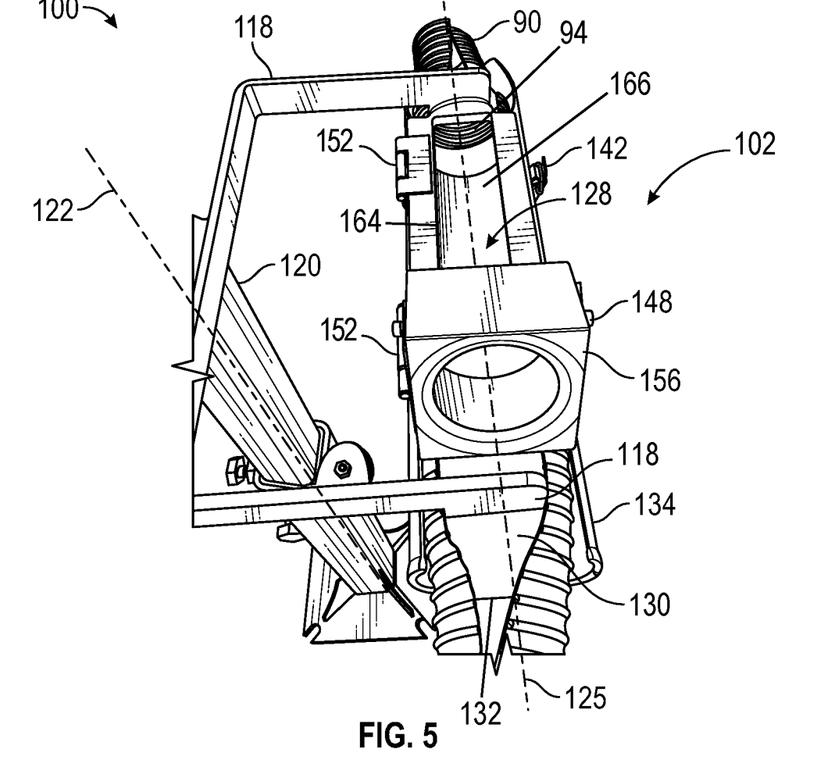
FIG. 5 is a partial top view of the cable assembly system, according to an illustrative embodiment.

As illustrated in FIG. 5, the receiving member 128 of the inner core 126 includes an insertion aperture 164 sized to allow a wire, cable, conductor, other elongated element, or an aggregation thereof (not shown), to be received within the inner cavity 166 defined by the receiving member 128 of the cable assembly device 102 and ultimately within the inner cavity 94 of the wire loom 90. In operation, the wire guide 156 receives, within the annular opening 158, the one or more conductors from a supply reel (not shown) and guides the one or more conductors into the insertion aperture 164 and within the inner cavity 166 of the receiving member 128. Once within the inner cavity 166 of the receiving member 128, the one or more conductors are moved along a longitudinal axis 125 of the inner cavity 166 of the inner core 126 and into the inner cavity 94 of the wire loom 90, which is already spread open, at the longitudinal split 92, by the splitter member 130 of the inner core 126 and which is moving co-axially between the inner core 126 and the outer housing 134. The insertion aperture 164 may be of any convenient shape but is preferably rectangular, circular, or oval.

According to embodiments and as illustrated in FIGS. 1 and 7-8, the outer housing 134 includes two separable parts, a fixed portion 134a and a movable portion 134b. When in a closed position, as illustrated in FIGS. 1-5, the fixed portion 134a and the movable portion 134b of the outer housing 134 are secured to one another by one or more latches 142, screws, bolts, or other attachment members. To move the outer housing 134 from the closed position to an opened position, illustrated in FIGS. 7-8, the one or more latches 142 are unfastened to allow the movable portion 134b to detach from the fixed portion 134a. When detached, the movable portion 134b may be rotated about the hinges 152 to expose the inner core 126 and allow for easier positioning of the wire loom 90 over the receiving member 128 and the splitter member 130 of the inner core 126 for loading conductors into the wire loom 90. Once the wire loom 90 is positioned on the inner core 126, the movable portion 134b of the outer housing 134 may be rotated back to the closed position and secured to the fixed portion 134a via the one or more latches 142, causing the wire loom 90 to be positioned between the outer housing 134 and the receiving and splitter members 128, 130 of the inner core 126 to prevent the wire loom 90 from slipping off of the inner core 126 as the wire loom 90 moves along a length of the inner core 126. According to some embodiments, when the cable assembly device 102 is in the closed position, as shown in FIGS. 1-5, the distance between the outer housing 134 and the receiving member 128 of the inner core 126 is $\frac{5}{8}^{th}$ of an inch.

In some embodiments, the cable assembly device 102 is held stationary, relative to the wire loom 90 that moves axially through the cable assembly device 102, by a supporting member 116 including a frame 118 and a stanchion 120. According to embodiments, the frame 118 of the supporting member 116 includes a back support attached to the stanchion 120 and two arm supports, each attached to the cable assembly device 102. As illustrated in FIG. 1, one of the arm supports of the frame 118 may be attached proximate the end of the receiving member 128 on which the splitter member 130 is mounted, and the other arm support may be attached proximate an opposite end of the receiving member 128. Although the frame 118 discussed herein includes two arm supports, it should be understood that the frame 118 may include one or more arm supports for attaching the frame 118 to the cable assembly device 102.

The frame 118 may be coupled at or near the top of the stanchion 120 of the supporting member 116 in a rigidly affixed manner. Alternatively, the frame 118 may be coupled to the stanchion 120 by a floating or adjustable joint, such as a ball joint, which allows the frame 118 to move in two or three dimensions relative the stanchion 120. A floating or adjustable joint would allow for the spontaneous self-adjustment of the longitudinal axis 125 of the inner core 126 in two or three dimensions to match a potentially variable longitudinal axis of the wire loom 90 as the wire loom 90 is unwound from a supply reel (not shown), passed through the cable assembly device 102, and then inserted within a conduit or wound upon a take-up reel (not shown) after existing the cable assembly device 102. The frame 118 may also be rotated horizontally about a longitudinal axis 122 of the stanchion 120 that is vertical to a mounting surface 121 on which the stanchion 120 sits or is attached. As illustrated in FIG. 4, the frame 118 may be mounted in a horizontal position parallel to or at least substantially parallel to the mounting surface 121 and perpendicular to or substantially perpendicular to the longitudinal axis 122 of the stanchion 120. However, the frame 118 may be mounted in any orientation relative to the stanchion 120 as may be deemed convenient. As illustrated in FIGS. 1, 4, and 8, the stanchion 120 may be telescoping, allowing the height of the frame 118, and ultimately the cable assembly device 102, to be adjusted relative to the mounting surface 121.

Figure 9:
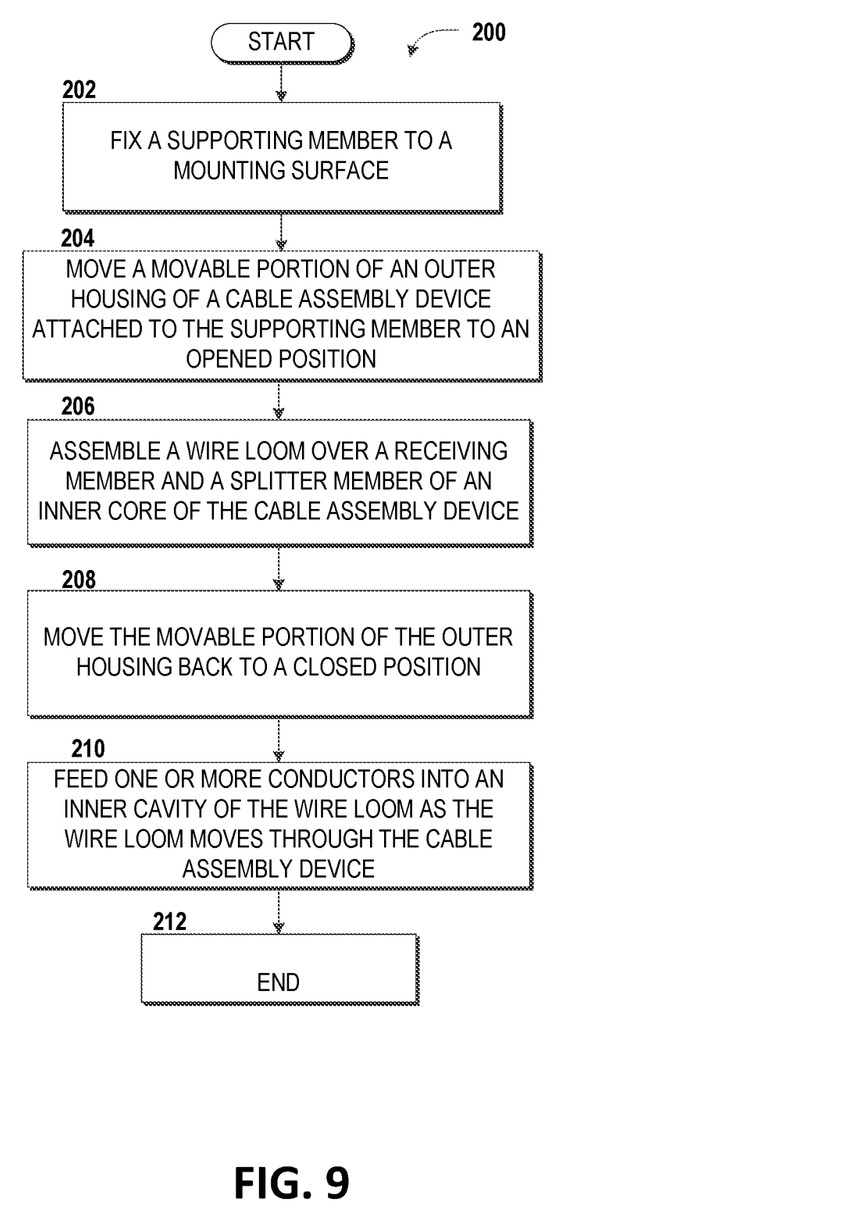
FIG. 9 is a flow diagram illustrating aspects of a method for assembling a cable loom.

Turning now to FIG. 9, aspects of a method 200 for assembling a wire loom, such as the wire loom 90, using the cable assembly device 102 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein. It also should be understood that the methods disclosed herein can be ended at any time and need not be performed in its entirety.

The method 200 begins at operation 202, where a supporting member, such as the supporting member 116, is fixed to the mounting surface 121. According to embodiment, the stanchion 120 of the supporting member 116 is fixed on one end to the mounting surface 121, such as a floor, a deck, a bench, a wall, a bulkhead or other foundational structure, by screws, bolts, anchors, or other fastening members. The cable assembly device 102 may be mounted to the frame 118 of the supporting member 116 either before or after mounting the supporting member 116 to the mounting surface 121.

From operation 202, the method 200 proceeds to operation 204, where the movable portion 134b of the outer housing 134 is moved to an opened position, as illustrated in FIGS. 7-8, to provide access to the inner core 126 for easier mounting of the wire loom 90 on the inner core 126. The movable portion 134b of the outer housing 134 may be moved to the opened position by unfastening the one or more latches 142 to allow the movable portion 134b to detach from the fixed portion 134a of the outer housing 134. When detached, the movable portion 134b may be rotated about the hinges 152 to expose the inner core 126 and allow for easier positioning of the wire loom 90 over the receiving member 128 and the splitter member 130 of the inner core 126 for loading conductors into the wire loom 90.

From operation 204, the method 200 proceeds to operation 206, where the wire loom 90 is assembled over the receiving member 128 and the splitter member 130 of the inner core 126. According to embodiments, after aligning the longitudinal split 92 of a segment of the wire loom 90 with the underside of the receiving member 128 of the inner core 126, the wire loom 90 is pushed towards the inner core 126, causing the longitudinal split 92 to spread apart lengthwise and allow the receiving and splitter members 128, 130 to be received within the inner cavity 94 of the wire loom 90 to assemble the segment of the wire loom 90 over the receiving member 128 and the splitter member 130 of the inner core 126. Alternatively, or additionally, the longitudinal split 92 of the wire loom 90 may be spread apart by hand prior to pushing the wire loom 90 towards the inner core 126 so that less force is required to assemble the wire loom 90 over the receiving member 128 and the splitter member 130 of the inner core 126. The above description allows the wire loom 90 to be assembled over the receiving member 128 and the splitter member 130 of the inner core 126 at any point along the length of the wire loom 90. If the wire loom 90 is being assembled on the cable assembly device 102 at an end of the wire loom 90, the end of the wire loom 90 may be fed over the front end 132 of the splitter member 130 of the inner core 126, causing the longitudinal split 92 of the wire loom 90 to begin to spread apart lengthwise to allow the receiving and splitter members 128, 130 to be received within the inner cavity 94 of the wire loom 90 as the wire loom is moved along the length of the inner core 126. The wire loom 90 may continue to be pulled or pushed, by hand or an electric drive, along the length of the inner core 126 to assemble a segment of the wire loom 90 over the receiving member 128 and the splitter member 130 of the inner core 126. Regardless of how the wire loom 90 is assembled over the receiving and splitter members 128, 130, as the wire loom 90 is pushed or pulled along the length of the inner core 126, the splitter member 130 spreads open the longitudinal split 92 of the wire loom 90 and the receiving member 128 holds the longitudinal split 92 open through the length of the receiving member 128 to allow one or more conductors to be inserted within the wire loom 90, as described further below.

Once the wire loom 90 is assembled over the receiving member 128 and the splitter member 130 of the inner core 126 of the cable assembly device 102, the method 200 proceeds from operation 206 to operation 208, where the movable portion 134b of the outer housing 134 is rotated back to the closed position and secured to the fixed portion 134a via the one or more latches 142, causing the segment of the wire loom 90 to be loosely enclosed between the outer housing 134 and the receiving and splitter members 128, 130 of the inner core 126. Placing the outer housing 134 in the closed position after the wire loom 90 is assembled on the inner core 126 supports the wire loom 90 as segments of the wire loom 90 pass through the cable assembly device 102 and prevents the wire loom 90 from slipping off of the inner core 126 as the wire loom 90 moves along the length of the inner core 126 and jamming within the cable assembly device 102 and/or from prematurely closing, at the longitudinal split 92, prior to receiving one or more conductors, as discussed further below.

From operation 208, the method 200 proceeds to operation 210, where one or more conductors are fed from a source into the inner cavity 94 of the wire loom 90 as the wire loom 90 is either pushed or pulled through the cable assembly device 102. According to embodiments, the one or more conductors are fed from a source, such as a reel, and through the annular opening 158 of the wire guide 156, which guides the one or more conductors into the insertion aperture 164 of the inner core 126 to be received within the inner cavity 166 of the receiving member 128 and ultimately within the inner cavity 94 of the segment of the wire loom 90 that is assembled coaxially over the receiving and splitter members 128, 130 of the inner core 126. According to embodiments, the bracket 148 containing the wire guide 156 is attached to the end of the receiving member 128 proximate the splitter member 130, instead of at the end of the receiving member 128 opposite the splitter member 130 or at another location along the length of the receiving member 128, to afford the one or more conductors the length of the receiving member 128 to be guided by the wire guide 156 into the inner cavity 166 of the receiving member 128 and the inner cavity 94 of the wire loom 90 before the wire loom 90 moves beyond the inner core 126 at which time the wire loom 90 naturally begins to close at the longitudinal split 92 because the longitudinal split 92 is no longer spread apart by the inner core 126 of the cable assembly device 102.

As the one or more conductors are fed into the cable assembly device 102, the wire loom 90 is moved along the length of the inner core 126 at a velocity that is the same as or substantially similar to a velocity at which the one or more conductors are being fed into the cable assembly device 102. Once the one or more conductors reach the end of the receiving member 128 opposite the end where the splitter member 130 is mounted, the one or more conductors are securely positioned within the inner cavity 166 of the inner core 126 and within the inner cavity 94 of the wire loom 90 mounted over the receiving and splitter members 128, 130 of the inner core 126 and moving along the length of the same. As the wire loom 90 exits the inner core 126 at the end of the inner core 126 opposite the splitter member 130, the wire loom 90 begins to close at the longitudinal split 92, enclosing the one or more conductors within the inner cavity 94 of the wire loom 90. As is best illustrated in FIG. 4, an end of the outer housing 134 opposite the splitter member 130 of the inner core 126 may extend beyond the end of the receiving member 128 to maintain support of the wire loom 90 after the wire loom 90 exits the inner core 126 and as the wire loom 90 continues to close at the longitudinal split 92, ensuring that the wire loom 90 loaded with the one or more cables remains relatively parallel with the one or more conductors until the wire loom 90 is substantially closed to secure the one or more conductors within the inner cavity 94. As the wire loom 90 loaded with the one or more conductors exits the end of the outer housing 134 opposite the splitter member 130 of the inner core 126, the wire loom 90 may be guided into a conduit or loaded onto another reel. Based on the above, as the wire loom 90 is drawn or pushed through the cable assembly device 102, the wire loom 90 is spread open, at the longitudinal split 92, by the splitter member 130 and maintained open by the receiving member 128 as one or more conductors are loaded, via the wire guide 156, insertion aperture 164, and inner cavity 166 of the inner core 126, within the inner cavity 94 of the wire loom 90. From operation 210, the method 200 move to operation 212, where the method 200 ends.

The subject matter described above is provided by way of illustration only and should not be construed as limiting. Various modifications and changes may be made to the subject matter described herein without following the example embodiments and applications illustrated and described, and without departing from the true spirit and scope of the present invention, which is encompassed in the following claims.

What is claimed is:

1. A cable assembly device comprising:
    an inner core comprising
        a receiving member having a first cylindrical portion comprising a first end and a second end, and
        a splitter member attached proximate the first end of the first cylindrical portion of the receiving member; and
    an outer housing having a second cylindrical portion, wherein at least a portion of the inner core is enclosed within the second cylindrical portion of the outer housing, and wherein the second cylindrical portion of the outer housing and at least the first cylindrical portion of the receiving member of the inner core are arranged coaxially with one another.

2. The cable assembly device of claim 1, wherein the receiving member defines an inner cavity for receiving one or more elongated elements therein.

3. The cable assembly device of claim 2, wherein the receiving member further comprises an insertion aperture that provides access to the inner cavity of the receiving member.

4. The cable assembly device of claim 3, further comprising a wire guide attached proximate the splitter member of the inner core, wherein the wire guide guides the one or more elongated elements into the insertion aperture of the receiving member.

5. The cable assembly device of claim 1, wherein the outer housing comprises a fixed portion and a movable portion, and wherein the fixed portion is attached to the inner core and the movable portion is attached to the fixed portion such that the movable portion is adjustable from a closed position to an opened position.

6. The cable assembly device of claim 5, wherein when the movable portion of the outer housing is in the opened position, an underside of the receiving member is exposed.

7. The cable assembly device of claim 1, wherein the splitter member is shaped to engage an inner cavity of a wire loom and open a split of the wire loom as the wire loom is moved over at least a portion of the splitter member to allow one or more elongated elements to be fed into the inner cavity of the wire loom via the receiving member of the inner core.

8. A system comprising:
    a supporting member; and
    a cable assembly device attached to the supporting member, the cable assembly device comprising
        an inner core comprising
            a receiving member having a first cylindrical portion comprising a first end and a second end, and
            a splitter member attached proximate the first end of the first cylindrical portion of the receiving member, and
        an outer housing having a second cylindrical portion, wherein at least a portion of the inner core is enclosed within the second cylindrical portion of the outer housing, and wherein the second cylindrical portion of the outer housing and at least the first cylindrical portion of the receiving member of the inner core are arranged coaxially with one another.

9. The system of claim 8, wherein the receiving member defines an inner cavity for receiving one or more elongated elements therein.

10. The system of claim 9, wherein the receiving member further comprises an insertion aperture that provides access to the inner cavity of the receiving member.

11. The system of claim 10, wherein the cable assembly device further comprises a wire guide attached proximate the splitter member of the inner core, wherein the wire guide guides the one or more elongated elements into the insertion aperture of the receiving member.

12. The system of claim 8, wherein the outer housing comprises a fixed portion and a movable portion, wherein the fixed portion is attached to the inner core and the movable portion is attached to the fixed portion such that the movable portion is adjustable from a closed position to an opened position, and wherein when the movable portion of the outer housing is in the opened position, an underside of the receiving member is exposed.

13. The system of claim 8, wherein the splitter member is shaped to engage an inner cavity of a wire loom and open a split of the wire loom as the wire loom is moved over at least a portion of the splitter member to allow one or more elongated elements to be fed into the inner cavity of the wire loom via the receiving member of the inner core.

14. The system of claim 8, wherein the supporting member comprises a frame attached to the cable assembly device and a stanchion coupled to the frame.

* * * * *